United States Patent [19]

Dietrich et al.

[11] 4,193,379
[45] Mar. 18, 1980

[54] COMPRESSION-IGNITION INTERNAL COMBUSTION ENGINE

[75] Inventors: Werner Dietrich, Heppenheim; Oswald Hiemesch, Lampertheim, both of Fed. Rep. of Germany

[73] Assignee: Motoren-Werke Mannheim AG, Mannheim, Fed. Rep. of Germany

[21] Appl. No.: 817,526

[22] Filed: Jul. 19, 1977

[30] Foreign Application Priority Data

Jul. 31, 1976 [DE] Fed. Rep. of Germany ....... 2634470

[51] Int. Cl.² .................................................. F02B 3/00
[52] U.S. Cl. ................................... 123/32 C; 123/32 D
[58] Field of Search ............... 123/32 C, 32 D, 32 SP, 123/30 D

[56] References Cited

U.S. PATENT DOCUMENTS

| | | | |
|---|---|---|---|
| 2,743,711 | 5/1956 | Gross | 123/32 C |
| 2,799,256 | 7/1957 | Stump | 123/32 C |
| 3,058,452 | 10/1962 | Espenschied | 123/32 C |
| 3,814,067 | 6/1974 | Fuente | 123/32 C |

*Primary Examiner*—Ronald B. Cox
*Attorney, Agent, or Firm*—Haseltine, Lake & Waters

[57] ABSTRACT

A compression-ignition internal combustion engine including a mixing chamber in permanently open communication with a cylinder of the engine via a duct, there being provided means for injecting fuel into the mixing chamber during compression of combustion air in the cylinder, the fuel being injected in a direction toward the duct and having the form of a narrow core jet surrounded by fine droplets such that combustion air displaced into the mixing chamber during the compression flows counter-currently to the core jet, and turbulence-producing means disposed within the chamber in the path of the inflowing displaced air and located so as to be outside the core jet, whereby inflowing displaced air impinges on the turbulence-producing means so as to increase the intensity of mixing of the fuel and air.

9 Claims, 3 Drawing Figures

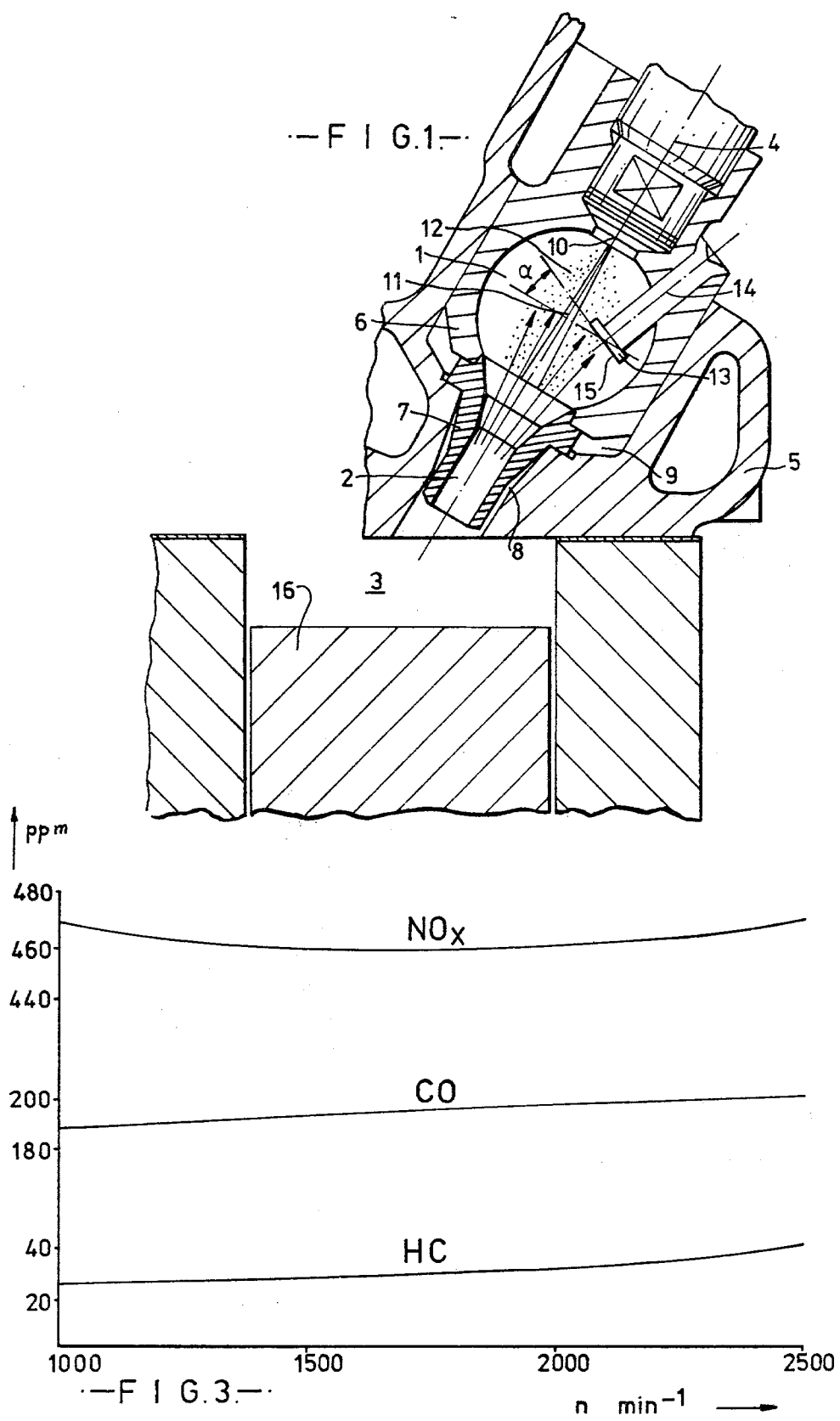

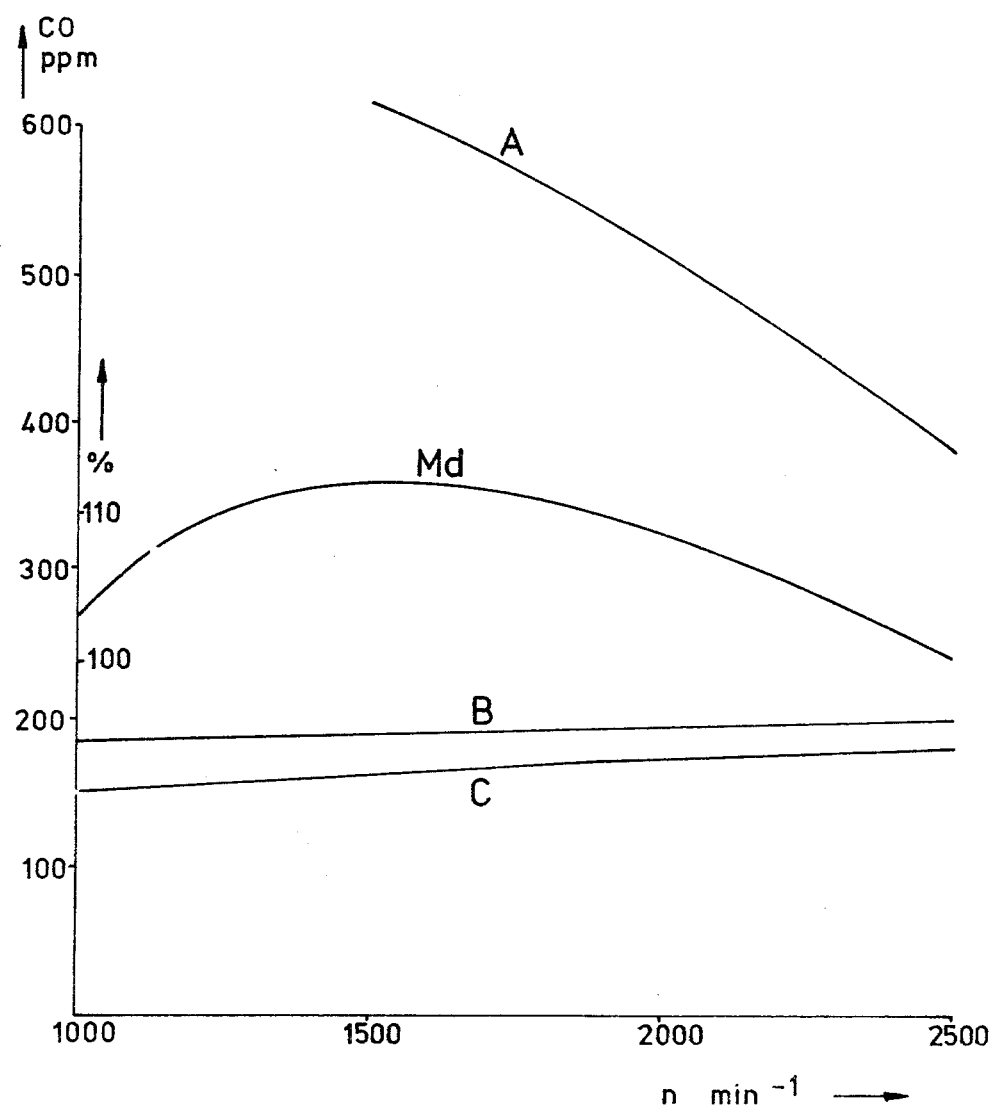

COMPRESSION-IGNITION INTERNAL COMBUSTION ENGINE

FIELD OF THE INVENTION

This invention relates to a compression-ignition internal combustion engine including a mixing chamber.

DESCRIPTION OF THE PRIOR ART.

Compression-ignition internal combustion engine including an adjoining chamber (a precombustion chamber or turbulence chamber), i.e. diesel engines with indirect combustion, have long been used with advantage in mines and enclosed spaces by virtue of the low concentration of carbon monoxide in their exhaust gases. However, since the legislative authorities of several countries have already laid down, or are in the course of laying down, lower limits to the concentration of pollutants in the engine exhaust gases for applications such as these, it is becoming increasingly difficult to reconcile the increased demands which diesel engines are having to satisfy in regard to output and torque with the tightening up of health regulations.

In vehicle engines, it is desirable to combine high power output at full rotational speed with an increase in torque at low rotational speeds, which increase in torque should be at least 10%. In general, however, the emission of CO in the engine exhaust gases increases with increasing torque not only on account of the reduced excess of air, but primarily because the intensity of mixing of the fuel/air mixture falls with decreasing rotational speed. The result of this is that normal diesel engines with indirect combustion are unable to satisfy the more stringent legal requirements at low rotational speeds, i.e. in the region of maximum torque. Since these requirements do not allow the limits to be exceeded in any operating range of the engine, there is no alternative but to operate engines of the type in question at reduced output power.

It is known that diesel engines with mixing chambers can be provided with baffles on which the core jet impinges to improve the hot-running of the engine after starting and also its idling characteristics (U.S. Pat. No. 2,787,258). However, investigations have shown that baffles of this type are unable, in the partial-load region, to reduce the concentration of CO by way of a secondary effect to the permitted level of 500 ppm prescribed in the Federal Republic of Germany for underground workings.

It is known that both diesel engines with a mixing chamber and also diesel engines with direct injection can be provided with rod-like heater plugs which, after electrical heating, enable the engine to be cold-started. Unfortunately, these spoilers which project into the combustion chamber or mixing chamber have an adverse effect during the subsequent normal running of the engine insofar as they affect unfavourably the directed flow of compressed combustion air, above all in the case of spiral flows. Accordingly, those parts of the heater-plug rods which act as spoilers only project into the combustion chamber or mixing chamber as far as is necessary to satisfy the requirements involved in cold starting. The inclination at which these heater-plug rods are installed is necessary on purely structural grounds. In order to minimise the above-mentioned flow losses, the rod-like part of these heater plugs which acts as a spoiler is provided with the smallest possible diameter which still just provides for an adequate thermal capacity and surface temperature, and with a lenticular or hemi-spherical end. Neither are the rod-like heater plugs able in the partial-load region to reduce the concentration of CO in the engine exhaust gases by way of a secondary effect to the level mentioned above.

OBJECT OF THE INVENTION

It is an object of the present invention to provide a compression ignition internal combustion engine including a mixing chamber in which the emission of pollutants is reduced at high torque.

It is desirable, of course, to obtain not only as low as possible a concentration of pollutants in the engine exhaust gases at maximum power output and full rotational speed, but also to obtain a value for the concentration of pollutants which is largely independent of torque, not only for carbon monoxide (CO), but also for the other pollutants in the exhaust gases, such as the unburnt hydrocarbons (HC) and the nitrogen oxides ($NO_x$).

SUMMARY OF THE INVENTION

According to the present invention there is provided a compression-ignition internal combustion engine comprising:
at least one combustion cylinder;
a piston reciprocably arranged in the cylinder;
a mixing chamber;
a duct permanently communicating the cylinder with the mixing chamber;
means for injecting fuel into the mixing chamber during compression of combustion air in the cylinder, the fuel being injected in a direction toward the duct and having the form of a narrow core jet surrounded by fine droplets such that combustion air displaced into the mixing chamber during the compression flows countercurrently to the core jet; and
turbulence-producing means disposed within the chamber in the path of the inflowing displaced air and located so as to be outside of the core jet, whereby inflowing displaced air impinges on the turbulence-producing means so as to increase the intensity of mixing of the fuel and air.

In contrast to the above-mentioned known spoilers or baffles provided for other purposes in the mixing chambers of diesel engines, the present invention is directed, as mentioned above, towards improving pollutant behaviour by means of the above-mentioned turbulence-producing means.

BRIEF DESCRIPTION OF THE DRAWINGS

In the drawings:

FIG. 1 illustrates schematically a part of a compression-ignition internal combustion engine in accordance with the present invention;

FIG. 2 is a graph showing the CO-content of the exhaust gases of a diesel engine according to FIG. 1, but in which in one case (curve A) a conventional rod-type heater plug, in the second case (Curve B) one embodiment of the turbulence body and in the third case (curve C) another embodiment of the turbulence body is installed, in dependence upon the rotational speed of the engine for a predetermined torque trend Md; and FIG. 3 shows, in addition to a curve of the CO-value of FIG. 2, the corresponding concentrations of HC and $NO_x$.

DESCRIPTION OF PREFERRED EMBODIMENTS

Referring now to the drawings, FIG. 1 shows a part of a compression-ignition internal combustion engine comprising a piston 16 reciprocably arranged within a combustion cylinder 3 and provided with a mixing chamber 1 which has a spherical inner wall. The inner wall merges into a duct 2 which establishes a permanently open communication between the mixing chamber 1 and the combustion cylinder 3. The mixing chamber 1 is generally symmetrical about the axis 4. The duct 2 extends coaxially of the axis 4. The mixing chamber 1 is in the form of a unit 6 inserted into the water-cooled cylinder head 5 of the diesel engine.

The duct 2 is formed by an insert 7 of heat-resistant material which, by means of the mixing chamber unit 6, on which fastenings (not shown) act, is sealingly applied to co-operating surfaces of the cylinder head 5 and the unit 6. The insert 7 is largely heat-insulated with respect to the cylinder head 5 by air gaps 8 and 9, whilst the mixing chamber unit 6 has only a small amount of play in its receiving bore in the cylinder head 5 so that heat may be conducted away from the mixing chamber 1 to the water-cooled walls of the cylinder head 5.

Towards the end of the compression stroke of the piston 16, fuel is sprayed from an injection nozzle 10, in the form of a throttle pin nozzle with a theoretical spraying angle 0°, in the form of a narrow cone jet 11 surrounded by a mist of fine droplets 12. A turbulence body in the form of a circular member 13 is installed in the mixing chamber 1 by means of a pin 14, which pin has a smaller diameter than the member 13. In this way, a further sharp-edged, turbulence-generating shoulder may be formed at the junction between the member 13 and the pin 14 which further increased the intensity of mixing of the fuel/air mixture.

The end face 15 of the member 13 lies in the region of a plane passing through the centre of the mixing chamber 1 and disposed normal to the axis 4. In the embodiment illustrated, this normal plane passes through the centre of the end face 15. In the embodiment illustrated, in which the inner wall of the mixing chamber 1 is spherical, the centre normal plane is that plane on which the inner wall of the mixing chamber delimits the largest area, i.e. in this case the normal plane passing through the centre of the sphere.

In the case of a mixing chamber having an inner wall in the form of an ellipsoid of rotation, the centre normal plane is the plane extending perpendicularly of the major axis of the ellipse on which the inner wall of the mixing chamber delimits the largest area, the major axis of the ellipse and the axis of the core jet being identical. If the inner wall of the mixing chamber consists for example of a middle section in the form of a hollow cylinder and two hemi-spherical end sections, the centre normal plane passes through the centre of the middle section.

The periphery of the circular member 13 forms a sharp edge both with the end face 15 and also with its opposite side. The turbulence body does not necessarily have to be in the form of a disc. The mixing effect is also intense when the turbulence body has an elongate, for example cylindrical, form, provided that the position and the peripheral boundary of the end face 15 facing the duct are the same as in the case of the member 13. Neither does the end face 15 have to be completely flat, as illustrated. The required effect can also be obtained with concave forms. This also applies to a peripheral boundary of the end face 15 which deviates from the circular form, i.e. for example a member having a rectangular contour.

In the embodiment illustrated, the pin 14 is integral with the member 13 and, like the member 13, is made of a heat-resistant material. It is pressed into a bore of the mixing chamber unit 6 and fastened e.g. by riveting to its outside. Other fastenings are of course also possible, for example fastenings in which the turbulence body may readily be replaced.

The end face 15 of the member 13 is preferably inclined relative to the axis 4 in such a way that the air flowing into the mixing chamber substantially in the direction of the arrows during the injection process can be deflected towards the core jet 11. The thickness of the member 13 is approximately 20% of its diameter, and the diameter is preferably from 15 to 35% of the largest diameter of the mixing chamber normal to the axis 4. This is of particular importance in the case of engines for motor vehicles. In the embodiment illustrated, the diameter of the member 13 is about 30% of the largest diameter of the mixing chamber as measured perpendicularly of the axis 4.

The centre of the end face 15 is preferably situated approximately half way between the axis 4 and the inner wall of the mixing chamber unit 6. The plane in which the end face 15 lies preferably forms an angle $\alpha$, which in the embodiment illustrated amounts to 20°, with the plane normal to the axis 4 and passing through the center of the end face 15. The angle $\alpha$ may be between 15 and 25° the end face 15 being larger, the greater the angle $\alpha$.

FIG. 2 shows that the CO-content of the exhaust gases of a diesel engine with the mixing chamber shown in FIG. 1 can be influenced significantly by means of the turbulence body so that it is far below the upper limit of 500 ppm prescribed in the Federal Republic of Germany, and falls with decreasing rotational speed. In FIG. 2, the curves A, B, and C represent the Co-content in the exhaust gases of a diesel engine of which the torque follows the curve Md in dependence upon the rotational speed n. The particular torque is shown as a percentage of the nominal torque(100%) which the engine delivers at maximum power output, i.e. 2500 rpm. The Curve A shows the trend of the CO-value which is obtained when a normal heater plug is installed in the mixing chamber 1 in place of the turbulence body 13. Curve B shows the trend of the CO-value when a turbulence body 13 is installed of which the end-face diameter amounts to 24% of the largest diameter of the mixing chamber as measured perpendicularly of the axis 4. Curve C shows the trend of the CO-value when a turbulence body 13 is installed of which the end-face diameter amounts to 30% of the largest diameter of the mixing chamber. It can be seen that curve A exceeds the permitted value of 500 ppm at a low engine speed, whilst curves B and C are in the region of 200 ppm. This CO-value considerably below the permitted limit is of the greatest advantage inter alia when, in underground workings, mine gas with a methane content of up to 1.5% by volume is taken in together with the combustion air by the diesel engine because this methane concentration increases the emission of CO to a significant extent.

FIG. 3 shows the trend of the concentrations of carbon monoxide (CO), unburnt hydrocarbons (HC) and nitrogen oxides ($NO_x$) for the torque trend illustrated in FIG. 2, when a turbulence body 13 of which the end-face diameter amounts to 24% of the largest diameter of the mixing chamber is installed in the mixing chamber 1. The values of the curves for CO, HC and $NO_x$ are considerably below the corresponding pollutant concentrations of conventional diesel engines with a mixing chamber.

The engine according to the invention can be operated with the timing of the fuel injection being retarded. This leads to a reduction in the $NO_x$ content of the exhaust gases. In conventional engines this retardation would lead to an increase in the CO and HC contents of the exhaust gases, but this is not the case with the engine according to the invention.

We claim:

1. A compression-ignition internal combustion engine comprising: at least one combustion cylinder; a piston reciprocably arranged in the cylinder; a mixing chamber; said mixing chamber is axially symmetrical; a duct permanently communicating the cylinder with the mixing chamber; means for injecting fuel into the mixing chamber during compression of combustion air in the cylinder, the fuel being injected in a direction toward the duct and having the form of a narrow core jet surrounded by fine droplets, said duct and said core jet are each coaxial with said mixing chamber such that combustion air displaced into the mixing chamber during the compression flows counter-currently to the core jet; and turbulence-producing means disposed within the chamber in the path of the inflowing displaced air and located so as to be outside of the core jet, producing means, being further defined by a body which is formed with an end face having a thickness of from 15 to 35% of the largest cross section of said chamber normal to the axis thereof on which inflowing air impinges and which lies in the region of a plane normal to the axis of said chamber and passing through the center of said chamber, said end face being formed with a sharp-edged boundary so as to increase the intensity of mixing of the fuel and air.

2. An engine according to claim 1, wherein the thickness of said body is substantially 20% of the diameter of said body.

3. An engine according to claim 1, wherein the centre of said end face is located substantially mid-way between the axis of said chamber and the inner wall of said chamber.

4. An engine according to claim 1, wherein said end face is located in a plane which is inclined to the axis of said chamber, whereby inflowing air impinging on said end face is deflected towards said core jet.

5. An engine according to claim 4, wherein the plane including said end face is disposed at an angle of from 15° to 25° to a plane normal to the axis of said chamber.

6. An engine according to claim 1, wherein said body comprises a disc which is secured by means of a circular rod to the inner wall of said chamber, said rod having a smaller diameter than said disc.

7. An engine according to claim 6, wherein said disc has a thickness of substantially 20% of the diameter of said disc.

8. An engine according to claim 1 wherein said end face is circular.

9. An engine according to claim 1 wherein said end face is completely flat.

* * * * *